Patented Aug. 28, 1923.

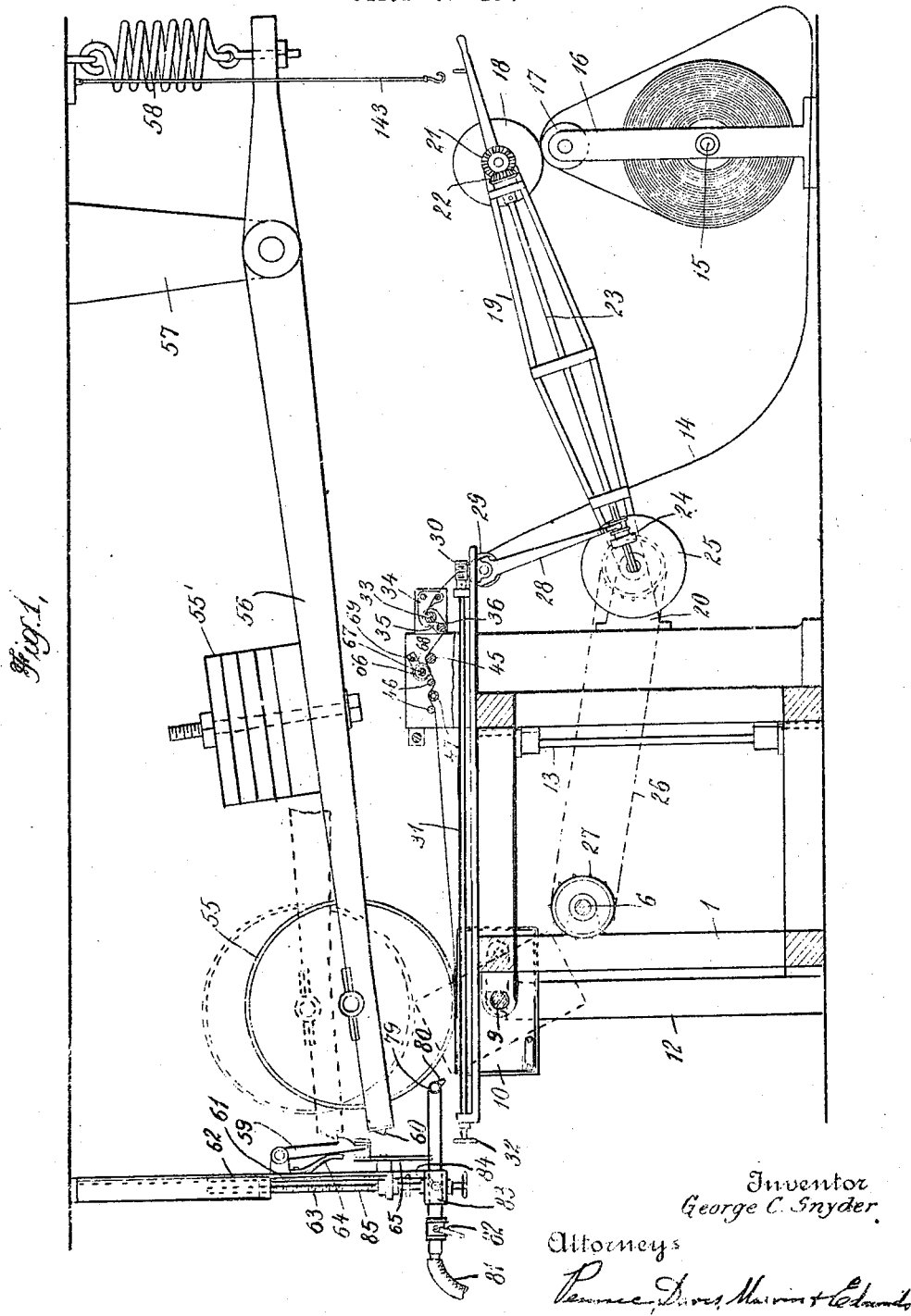

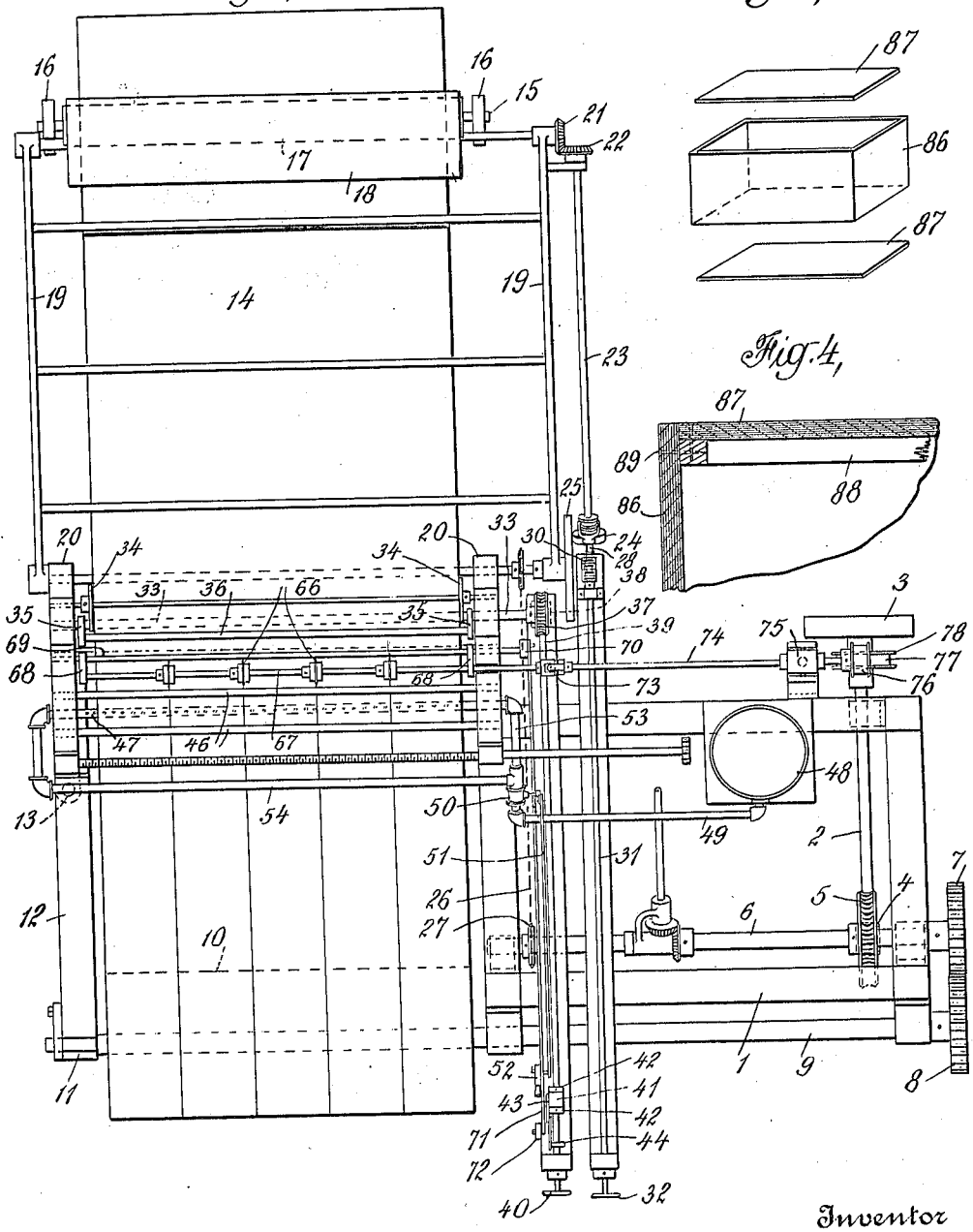

1,466,034

UNITED STATES PATENT OFFICE.

GEORGE C. SNYDER, OF NEW YORK, N. Y.

MANUFACTURE OF POLYHEDRAL LAMINATED ARTICLES.

Application filed December 18, 1919. Serial No. 345,746.

*To all whom it may concern:*

Be it known that I, GEORGE C. SNYDER, a citizen of the United States, residing at New York city, in the county of New York, State of New York, have invented certain new and useful Improvements in the Manufacture of Polyhedral Laminated Articles; and I do hereby declare the following to be a full, clear, and exact description of the invention, such as will enable others skilled in the art to which it appertains to make and use the same.

This invention relates to a process for manufacturing hollow articles from sheet material by a winding operation.

In my copending application, Serial No. 271,592, filed January 17, 1919, there is disclosed a process of making angular hollow ware by winding sheet material coated with a suitable adhesive in successive convolutions while imparting a convex contour to the faces of the articles to produce a binding effect between the convolutions to cause them to be firmly united to each other, so that when the adhesive has solidified hollow forms will be produced, the strength of which will depend upon the character and number of layers of material out of which they are formed. On account of the greater distance of the corners of the forms from their axis of rotation, there will be an increased binding effect between the layers of material at the corners during the winding operation, and the corners will be united into a compact mass to produce a strong rigid construction at these parts of the finished form.

Hollow forms produced in accordance with the invention of my said copending application may be used for a wide variety of purposes, but the faces of the forms will possess a slight convexity. This convexity may be removed to some extent by applying straight edge closure devices to the ends of the articles, and in case the articles are to be used as shipping containers for small boxes or packages, the convexity of the faces will cause them to act as absorbers of shocks or blows directed against them and thus furnish additional protection to the contents of the containers. In many cases, however, the convexity of the faces will be a distinct disadvantage and must be eliminated if the forms produced by the winding operation are to possess utility where flat faced shapes are required. The convexity of the faces of the forms may be largely removed by pressing or stretching the sides of the forms while the adhesive is in moist condition, and maintaining the forms in such stretched condition until the adhesive has solidified, but this procedure requires that additional operations be performed upon the articles, which adds to their cost of manufacture and lessens the rate of production. The sides of the articles may also be flattened by the use of straight strips of wood or other suitable material united to each other to form bands about the articles intermediate their ends, but this method also requires that extra operations be performed upon the articles, and the additional material adds to the weight of the articles and also increases their cost of production.

It is an object of this invention to provide a process of manufacturing out of sheet material wound forms of larger size than is possible by common methods and having flat faces, so that the necessity for subsequent operations to flatten the faces of the forms is eliminated, and when the process has been performed the articles are ready for the purpose for which they are to be used. The invention overcomes the difficulties which have heretofore limited the production of wound flat sided forms to comparatively small sizes.

In accordance with the invention the sheet material out of which the articles are to be produced is coated with adhesive and then wound into polyhedral forms having flat faces under the influence of pressure applied to the material to cause successive convolutions to be firmly pressed against preceding convolutions in order that they may become firmly united into a compact mass when the adhesive has solidified.

In my prior application referred to above, it is intended for the most efficient manufacture that a sheet of material as wide as possible be used, and the resultant form may be cut into a number of sections each corresponding to the desired length of the finished article. It is intended that this cutting operation shall be performed by means of a gang saw or other suitable device after the forms have been produced by the winding operation. This procedure, however, requires that extra operations be performed upon the wound bodies, and consequently adds to the cost of producing them.

As distinguished from the method of my said prior application, the present invention provides for the simultaneous production of a number of forms by cutting the sheet of material into strips of the desired width as the winding into polyhedral form progresses. This feature of the invention is particularly useful in the manufacture of trunks, chests and the like, for a sheet of material may be slit into two strips so that when wound upon the mandrel there is produced a form which may be used for the body of the article, and another form having the same shape and thickness, which may be used for producing the cover of the article.

The material out of which the relatively large articles contemplated by this invention are produced will usually be supplied in rolls, and it has been found in practice that in winding the material upon a polyhedral form of relatively large size, it cannot be unwound directly from the roll, because, on account of the increased radius of the corners of the form, there is a variation in the speed with which the material is unwound from the roll. If a brake be applied to the roll to prevent it from overrunning after the corners of the form are wound, the increased speed of the material at such times frequently results in tearing of the same under the resistance of the braking apparatus and in starting quickly the inertia of the heavy roll causes a similar overstrain to start it into motion. To overcome this difficulty the present invention provides for independently unwinding the material from the roll at a sufficient rate to maintain at all times an amount of slack between the roll and the form while applying tension to the material before it is wound into polyhedral form. This tension may be regulated to the proper amount to produce the required binding effect between the convolutions of material while preventing any tearing or overstrain of the material on account of irregularities in the winding speed, due to the shape of the form, or due to starting the machine quickly into a fast speed.

The invention also provides for the production of hollow forms which shall be free from any adhesive both inside and outside so that they may be coated with any suitable material to give the desired finish without danger of disintegrating action such as might occur if it were attempted to apply the finishing coats over the dried adhesive.

The particular nature of the several features of the process of the invention which have been briefly described will appear more clearly from a description of an apparatus by means of which the process may be carried out.

Such an apparatus is shown in the accompanying drawings, in which:—

Fig. 1 is an elevation partly in section of the apparatus;

Fig. 2 is a plan view of the apparatus;

Fig. 3 is a view of a wound form produced in accordance with the invention, together with the members which may be used for closing the open ends of the form;

Fig. 4 is an enlarged view showing one method of attaching the closure plates to the form.

The form of apparatus selected for illustration herein is similar to that which forms the subject matter of my copending application, Serial No. 346,123, filed December 19, 1919, to which reference may be made for a more detailed description of certain features of the apparatus than is necessary in the present case for an understanding of the invention disclosed herein. As shown herein this apparatus comprises a frame 1 which is composed of horizontal and vertical members suitably arranged to support the various elements of the apparatus in proper relation to each other. Mounted in suitable bearings near one end of the apparatus is a shaft 2 provided at its outer end with a pulley 3 adapted to be connected to a suitable source of power by means of a belt. The other end of the shaft is provided with a worm 4 meshing with a worm gear 5 on a shaft 6 mounted in suitable bearings on the frame of the machine and carrying at its outer end a gear 7 which meshes with a gear 8 on the end of a shaft 9 mounted in bearings on the frame and adapted to carry a mandrel 10 of any desired shape and size, upon which the articles are produced. The mandrel may have a removable corner piece, or may be constructed in any other manner to permit it to be collapsed so that a form wound thereon may be removed. The other end of the shaft 9 is supported in a bearing 11 on a portion of the frame 12 which is arranged so that it may be swung about a pivot rod 13 to remove the bearing 11 from the end of the shaft to permit the forms wound upon the mandrel to be removed, or to enable mandrels of different shapes and sizes to be placed upon the shaft.

The sheet material 14 which is to be employed for forming the articles is preferably supplied in a roll upon a spindle 15 which may be rotatably mounted in bearings in brackets 16 arranged near the apparatus. In producing polyhedral forms, it is necessary to provide a slack condition in the material between the supply roll and the winding mechanism, so that variations of speed of the sheet material around the polyhedral mandrel will not cause sudden pulls on the supply roll. It is also necessary to alter the rate at which the paper is fed from the roll according to the size of the form which is being produced upon the machine. For these purposes, there is mounted between the brackets 16 a roller 17 over which the material is drawn by a second roller 18 mounted at the outer end of a frame 19 which at its other end is pivotally mounted in brackets 20 attached to the frame of the apparatus. The shaft of roller 18 is provided with a beveled gear 21 which meshes with a beveled gear 22 on the end of a shaft 23 mounted in suitable bearings in the frame 19. A friction wheel 24 is splined upon the other end of shaft 23 and engages a friction wheel 25 driven by a sprocket chain 26 from a sprocket wheel 27 mounted on the shaft 6. By altering the point of contact between the friction wheels 24 and 25, the speed of rotation of the shaft 23 and consequently the speed of the roller 18, which unwinds the sheet material, may be controlled. For this purpose, the friction wheel 24 is connected to the end of an arm 28 so that it may be moved along the shaft 23 by swinging the arm. In order that the mechanism described above may be conveniently controlled by the operator, the arm 28 is provided with a gear 29 meshing with a worm 30 on the end of a shaft 31 which is provided with a hand wheel 32 at the end of the apparatus where the operator stands.

When slack is maintained between the supply roll and the winding mechanism, it is necessary to produce tension in the material before it is wound upon the mandrel, and the mechanism for this purpose should be constructed so that it may be conveniently manipulated to change the degree of tension. In accordance with the present invention, the tensioning device comprises a rod 33 mounted in brackets projecting from the framework of the machine, the rod being arranged at right angles to the direction of travel of the material or parallel to the axis of the winding mandrel. The brackets also carry a pair of rods upon which are mounted guides 34 projecting over the rod 33 and adapted to keep the edges of the strip of material in alinement with the ends of the mandrel. Attached to the rod 33 near its ends are brackets 35 and mounted between these brackets parallel to the rod is a second rod 36. As shown most clearly in Fig. 1, the sheet material is drawn around the rod 33 between the guides 34 and then around the rod 36. By adjusting the position of these rods in relation to the direction of travel of the paper, the latter comes in contact with more or less of the surfaces of the rods so that the friction between the material and the rods is altered to change the degree of tension in the material as it passes to the mandrel. The tensioning device should preferably be arranged so that it may be manipulated conveniently by the operator. For this purpose one end of the rod 33 carries a pinion 37 which meshes with a worm 38 on a shaft 39 extending to the other end of the apparatus where it may be provided with a hand wheel 40. By rotating the shaft 39 the tensioning device may be swung to change the friction between its rods and the material. It is also advisable to provide for the quick release of the tension in case of emergency or for any other reason. For this purpose there is placed upon the shaft 39 a sleeve 41 held in place by collars 42 fixed upon the shaft. Attached to the sleeve 41 is a link 43 connected to one end of a pivoted handle 44 arranged in position to be conveniently reached by the operator. By manipulating the handle 44 the shaft 39 may be moved longitudinally without rotation so that the worm 38 acts as a rack bar to rotate the pinion 37 which swings the tensioning device; and this movement will be more rapid than that which can be obtained by turning the pinion 37 by rotation of the shaft 39 by the hand wheel 40.

After the material passes over the tensioning device, it should be coated on its underside with suitable adhesive after it has been wound once around the mandrel. The material is first carried over a rod 45, then under a rod 46 from which it passes over a coating device resembling that shown in my copending application, Serial No. 271,592, referred to above, or in my copending application, Serial No. 308,582 filed July 3, 1919, as a division of the first named application directed particularly to the coating device. As shown in these applications, the coating device consists of a horizontal pipe 47 provided at the top with a longitudinal channel communicating with the interior of the pipe through small ducts. The top of the channel is provided with passages extending in the direction in which the material travels as it is drawn over the pipe 47, and through which the adhesive may flow from the longitudinal channel onto the surface of the material. Adhesive is supplied from a suitable tank 48 through a pipe 49 provided with a valve 50 which is located below the level of the pipe 47, thus insuring cessation of the supply of adhesive as soon as the valve is closed. The valve may be connected by a rod 51 with a handle 52 located in position where it may be conveniently manipulated by the operator. One end of the pipe 47 is connected to the supply pipe and valve by a pipe 53 and the other end of the pipe 47 is also connected to the supply pipe by pipe 54; so that adhesive may flow into the pipe 47 through both ends, thus producing a more uniform supply of adhesive and insuring that all parts of the sheet of material shall be properly coated with adhesive before passing to the winding mandrel. As in the case of the coating devices shown in my copending applications mentioned above, the pipe 47 may be rotated slightly about its longitudinal axis to alter the relation with respect to the surface of the material of the passages through which the adhesive flows so as to vary the amount of adhesive supplied to the material.

Due to the fact that all sheet material, such as paper, varies more or less in thickness there will be thin and thick spots as the convolutions of wound material pile up. These variations will not be readily apparent to the eye, but it is necessary that means be provided to search out and act upon the low or thin spots to produce good adhesion between successive convolutions of material by applying pressure to the convolutions as they are laid upon each other. One arrangement for applying pressure to the material comprises a roller 55 having a length substantially equal to that of the mandrel. The roller should be covered with a yielding substance such as rubber, heavy carpet or felt in order that it may search out irregularities in the material and produce the most effective pressing action upon the material as it is being wound upon the mandrel. The roller is rotatably mounted in a frame 56 which is supported at some distance from the roller in a bracket 57. The roller may be of such mass that its weight will produce sufficient pressure upon the material, but it may be necessary to produce additional pressure and for this purpose a weight 55' may be adjustably mounted on the frame 56. The pressure exerted by the gravity roller will depend upon its weight plus the weight of the frame upon which it is mounted, plus any additional weight which may be placed upon the frame. In practice it is found that at least forty pounds pressure per inch of width of the sheet to be wound should be employed. When the sheet material is thick and stiff the pressure must be considerably increased.

The method of supporting the roller so that it is held by gravity against the mandrel may be employed successfully if the mandrel is of relatively large size and rotates at relatively slow speed, but in case the mandrel is of relatively small dimensions, and is rotated at higher speeds, there will be a tendency for the roller to be thrown away from the mandrel immediately after its corners pass under the roller and the latter may not engage the following flat face of the mandrel in sufficient time to completely press the material on this entire flat face. To overcome this disadvantage of the gravity roller, the weight may be removed and the frame 56 may be extended beyond the bracket 57 and connected to a spring 58 of sufficient strength to overcome the tendency of the rapidly rotating mandrel to throw the roller 55 out of engagement with the faces of the mandrel. When gravity pressure alone is used the pressure may be regulated by moving the weight 55' nearer to or farther from the roller.

For the purpose of conveniently holding the roller 55 out of operative relation with the mandrel, there is provided a latch 59 having a shoulder adapted to engage a lug 60 on the end of the frame 56 to hold the roller out of contact with the mandrel. The latch 59 should preferably be arranged so that its position may be altered, and for this purpose it is attached to a frame 61 slidably mounted in guideways 62, and arranged to be set in any desired position of adjustment by means of a screw 63 extending into the member which carries the guideways. The latch 59 is normally pressed outwardly by a spring 64, but it may be held out of the path of the end of the frame 56 by a lock 65 which is here shown as a bar mounted on the frame 61 and back of which the end of the latch may be hooked when desired. By virtue of the construction described above, it is possible to adjust the position of the latch 59 so that when the form being wound upon the mandrel reaches the desired thickness, the roller 55 will be elevated when it passes over a corner of the mandrel, as indicated in dotted lines in Fig. 1, sufficiently to permit the lug 60 to engage the shoulder of the latch to automatically place the roller out of commission, and at the same time serve as a signal to the operator of the machine to show that the form being wound upon the mandrel has reached the desired thickness. It will be understood that other means may be used to automatically perform this function of holding up the roller when the desired number of windings have been made.

Reference has previously been made to the fact that the apparatus of the invention provides for slitting the sheet of material before and during the time it is wound upon the mandrel so that a number of separate forms, each of the same shape and thickness may be produced by one winding operation. For the purpose of slitting the material, there is provided a series of circular knives 66 adjustably mounted upon a shaft 67. The knives may be mounted upon the shaft by means of the arrangement shown in my copending application, Serial No. 346,123, referred to above, or in any other suitable manner.

The shaft 67 is rotatably mounted in brackets 68 on a shaft 69 mounted in suitable bearings in the frame of the apparatus and provided at one end with an arm 70 to the outer end of which is connected a rod 71, leading to a handle 72 arranged near the other operating handles of the apparatus so that it may be conveniently manipulated by the operator.

One end of the shaft 67 upon which the slitting knives are mounted, is connected by means of a universal joint 73 to a shaft 74 mounted in a swinging bearing 75, and carrying at its other end a pulley 76 by means of which the shaft may be driven by a belt 77 passing over a pulley 78 on the main shaft 2 of the apparatus. The universal joint 73 and the swinging bearing 75 are provided to take care of the change in position of the shaft 67 according to whether the slitting knives engage the material or are out of contact therewith. In the apparatus as described above it is intended that pressure shall be applied to the material by means of a roller, but instead of using mechanical means for this purpose an air blast may be directed against the material to press the convolutions against each other while the adhesive is solidifying. By heating the air the rapidity with which the material is dried may be increased. In accordance with this modification of the invention there is provided a pipe 79 extending parallel to the axis of the mandrel and provided with a longitudinal nozzle 80 having a relatively narrow slot to increase the velocity of the air as it is emitted from the pipe. Compressed air may be supplied to the pipe through a hose 81 leading to a suitable compressor, and attached to a branch pipe which carries the pipe 79 at its other end. A valve 82 is provided in the branch pipe for controlling the supply of air.

The pipe should preferably be mounted in such a manner that its position with respect to the mandrel may be changed as desired. For this purpose the branch pipe may pass through a clamp 83 carried upon the lower end of a frame 61 and arranged to be set in any desired position of adjustment by means of a screw 85 extending into the member within which these frames are mounted.

The mode of operation of the several mechanisms of the apparatus will appear from the above description of these mechanisms, but the operation of the entire apparatus may be briefly reviewed. A mandrel of the required size and shape will be placed upon the shaft 9. A roll of sheet material of the desired width will be placed between the brackets 16, and the material will be drawn over the roller 17, then over one of the rods upon which the guides 34 are mounted so as to bring the sheet between the guides which will be set in alinement with the ends of the mandrel. The sheet is then drawn around the bars 33 and 36 of the tension device, which at this time should be so set that little or no tension is exerted upon the strip, then over the rod 45, under the rod 46, over the tube 47 of the coating device, under a corresponding rod 46 and then to the mandrel where the edge may be fastened in place by being clamped between the body of the mandrel and the removable corner piece. While the sheet is being drawn over the tube 47 and during the first revolution of the mandrel the valve 50 will be closed to prevent any adhesive from being supplied to the sheet, so that the first convolution will not be stuck to the mandrel. After the first convolution has been wound, the valve 50 will be opened by manipulation of the handle 52 to allow adhesive to flow into the tube 47 and onto the face of the material. The tensioning device will be adjusted by means of the hand wheel 40 to produce the required degree of tension in the material as it is wound upon the mandrel. The roller 18 is in contact with the material and driven at the proper speed to unwind the material from the roll at the desired rate to maintain a sufficient amount of slack between the roll and the apparatus. The speed of the roller 18 may be determined by the position of the friction wheel 24 with respect to the friction wheel 25 that is driven from the shaft 6 of the machine.

If the roller 55 is employed for producing pressure, it will be placed in contact with the material to press successive convolutions into engagement with preceding convolutions, so that they may become firmly united to each other as the adhesive solidifies. The winding operation will be continued until the walls of the form have the required thickness. When this occurs the roller will have reached such a height that its frame will automatically engage the latch 59. This will be more convenient than lifting the roller by hand on account of its weight. The supply of adhesive will be cut off, the machine will be stopped, and the material will be severed. The corner piece will then be removed from the mandrel, and the portion 12 of the frame will be swung out of the way to permit the wound form to be removed from the mandrel. The resultant form will be free from any adhesive on both its interior and exterior so that it may be coated with any suitable material to give it the desired finish without danger.

The apparatus may be made somewhat more automatic in its operation by adjusting the latch 59 so that when the material being wound upon the mandrel reaches the desired thickness, the roller will be raised to such a height as it passes over the corner of the mandrel, as indicated in dotted lines in Fig. 1, that the lug 60 will snap over the shoulder the latch to automatically take the roller 55 out of commission and at the same time give an indication to the operator that the winding operation should cease, whereupon he may stop the apparatus and remove the form. Instead of using the roller, the required pressure may be obtained by means of an air blast issuing from pipe 79 which will be properly positioned near the mandrel. The air may be heated to aid in drying the adhesive.

If during the winding operation the slitting knives 66 are lifted so that they do not come in contact with the material, the form produced upon the mandrel will have a length corresponding to the width of the sheet of material. On the other hand, if the knives occupy the position shown in Fig. 1, they will engage the material after it passes over the rod 45. Due to the rotation of the knives they will cut into the material and slit the same as indicated in Fig. 2, in which case there will be produced upon the mandrel a number of separate forms, the widths of which will depend upon the positions occupied by the slitting knives on the shaft 67. By drawing the material under tension beneath the knives they and their shaft may be carried on the brackets 68 and held in operative relation to the sheet of material without requiring that they bear upon a roller or other surface underneath the material, although a roller may be employed if desired. The knives may be suitably positioned and such adjustment may be made from one side of the sheet material only. The slitting knives it will be noted, slit the sheet material before the adhesive is applied. This is of advantage in that no adhesive comes into contact with the knives and so any gumming of the knives is prevented, as might happen if the slitting operation took place after the adhesive was applied to the strips.

As a result of the operations described above, there will be produced a flat sided form 86 which, if the mandrel is of rectangular shape, will appear as in Fig. 3. The forms thus produced may be used for a wide variety of purposes, but in most cases it will be necessary to apply closure devices to the open ends of the forms in order to produce the desired articles. These closure devices may be in the form of plates 87, which may be obtained by producing square forms in accordance with the process of the present invention, and thereafter cutting up the forms and using the four flat sides as covers or closures for the hollow forms 86.

The closures may be attached to the wound forms in any convenient manner. In Fig. 4 there is indicated a simple arrangement that may be employed for this purpose, consisting of strips 88 of wood or other suitable material, which are placed within the form 86 and attached to the latter and to the closure plate 87 by nails or other fastening devices 89. In order to prevent the material which is coated on the side nearest the mandrel from contacting with it and adhering to it, an initial convolution will be wound without coating, and thereafter the adhesive will be allowed to flow to the material, but obviously a first convolution of any other uncoated material which might be capable of being wound around the mandrel might be first so applied and the coated material from the supply roll then adhered to it and wound upon it so that the resulting product would still have no exposed adhesive inside or outside and would have a different lining material of a different grade or color, if desired.

While a preferred form of apparatus, by means of which the process of the invention may be carried out, has been shown and described, it will be understood that the processes may be performed upon other forms of apparatus and that various changes in the details of the processes may be made without departing from the principle of the invention as defined in the appended claims.

I claim:—

1. The improvement in the manufacture of polyhedral laminated articles by superposing convolutions of adhesive coated sheet material by winding, which comprises laying down convolutions of sheet material while under tension upon preceding convolutions by a substantially uniform pressure of considerable magnitude.

2. The improvement in the manufacture of polyhedral laminated articles by superposing convolutions of adhesive coated sheet material by winding, which comprises laying down convolutions of sheet material while under substantially uniform tension upon preceding convolutions by considerable pressure thereby obtaining an article, the faces of which are substantially flat.

3. The improvement in the manufacture of polyhedral laminated articles by superposing convolutions of adhesive coated sheet material by winding, which comprises laying down convolutions of sheet material while under substantially uniform tension upon preceding convolutions by considerable pressure, and maintaining the tension of the sheet material and the pressure thereon substantially uniform so that the faces of the article are substantially flat.

4. The improvement in the manufacture of polyhedral laminated articles by superposing convolutions of adhesive coated sheet material by winding, which comprises laying down convolutions of sheet material while under tension upon preceding convolutions by considerable pressure, and removing the pressure at a face edge in response to a predetermined combined thickness of the laminations.

5. The improvement in the manufacture of polyhedral laminated articles by superposing convolutions of adhesive coated sheet material by winding, which comprises laying down convolutions of sheet material while under substantially uniform tension upon preceding convolutions by considerable pressure, thereby obtaining an article, the faces of which are substantially flat, and removing the pressure at a face edge in response to a predetermined combined thickness of the laminations.

6. The improvement in the manufacture of polyhedral laminated articles by superposing convolutions of adhesive coated sheet material by winding, which comprises laying down convolutions of sheet material while under substantially uniform tension upon preceding convolutions by considerable pressure, and maintaining the tension of the sheet material and the pressure thereon substantially uniform so that the faces of the article are substantially flat, and removing the pressure at a face edge in response to a predetermined combined thickness of the laminations.

7. In an apparatus for producing polyhedral laminated articles having substantially flat faces by superposing convolutions of adhesive coated sheet material by winding, the combination of a polyhedral mandrel adapted for rotation, means for maintaining the sheet material under tension during winding, and a pressure roller adapted to lay the sheet material upon preceding convolutions on the mandrel with a substantially uniform pressure of considerable magnitude.

8. In an apparatus for producing polyhedral laminated articles having substantially flat faces by superposing convolutions of adhesive coated sheet material by winding, the combination of a polyhedral mandrel adapted for rotation, means for maintaining the sheet material under substantially uniform tension during winding, a pressure roller adapted to lay the sheet material upon preceding convolutions on the mandrel with considerable pressure and means for maintaining the pressure substantially uniform.

9. In an apparatus for winding hollow articles out of sheet material, the combination of a mandrel, means for rotating the mandrel to wind the material thereon, in conformity to the shape of the mandrel, means for coating the material with adhesive on its under-side during the winding operation, a swinging frame mounted above the mandrel, a roller mounted on the frame, means for holding the roller pressed constantly against the material as it is being wound upon the mandrel to cause the convolutions of material to adhere, and means for latching the roller in raised position during removal of wound article.

10. In apparatus for producing out of sheet material hollow articles having flat faces, the combination of a mandrel, means for rotating the mandrel to wind material thereon, means for supplying adhesive to the material during the winding operation, a roller mounted over the mandrel in position to bear against the material as it is being wound upon the mandrel to press the convolutions of material together, means adapted to hold the roller out of contact with the mandrel during the removal of a wound article, and means for adjusting the position of the last named means, so that it may support the roller at various heights when it has been lifted by the mandrel during the winding operation.

11. In apparatus for producing hollow articles out of sheet material, the combination of a mandrel, means for rotating the mandrel to wind material thereon, means for producing tension in the material during the winding operation, a shaft, a plurality of knives mounted upon the shaft, and means for bringing the knives into cutting relation with the material between the point at which tension is applied and the mandrel.

12. In apparatus for producing hollow articles out of sheet material, the combination of a mandrel, means for rotating the mandrel to wind material thereon, a shaft, a plurality of cutting knives mounted on the shaft, means for setting the knives in any desired position along the shaft, a movable frame on which the shaft is mounted, and means for moving the frame to bring the knives into cutting relation to the material as it is wound upon the mandrel whereby a plurality of similar forms may be produced thereon during the winding operation.

13. In apparatus for producing hollow articles by winding on a rotating mandrel sheet material to produce forms having the shape of the mandrel, the combination of means for applying tension on the material at a point between the supply roll and the mandrel, means for supporting a presser roller above the mandrel in position to press upon the material as it is wound, and means for supporting the roller so that the mandrel may be revolved without contacting with the roller after the roller has been lifted by the rotating mandrel to a predetermined height.

14. In apparatus for producing hollow articles, the combination of a polyhedral mandrel, means for rotating the mandrel to wind sheet material thereon, a roller positioned above the mandrel, means for bringing the roller into contact with the material wound thereon, and means for supporting the roller at an altitude higher than the lower level of the roller when such roller is raised to a higher level after it has rotated over a flat face of the mandrel toward or near a corner of the same.

15. In apparatus for producing polyhedral laminated articles by winding sheet material upon a rotating mandrel, the combination of means for applying tension to the sheet material, a pressure roller above the mandrel in position to press upon the mandrel as it is wound, and means for supporting the roller above its normal operating position when raised thereto from a corner of the mandrel.

16. In apparatus for winding polyhedral articles from sheet material, a rotatable mandrel, means for exerting tension on the sheet material, and means for exerting pressure upon the material while it is being wound upon the mandrel, said roller having an engaging face of yielding material adapted to search out irregularities in the material and to press all parts thereof firmly into engagement with previously wound convolutions of material.

17. An apparatus for forming hollow articles of sheet material comprising a mandrel, means for rotating the mandrel, means for applying adhesive to one side of the sheet material, a gravity actuated presser roller carried by a horizontally extending pivoted arm, adapted to ride on top of the mandrel to press the successive layers of sheet material into intimate contact with one another, and means for engaging said arm when the roller is lifted to a selected height to hold the arm.

18. An apparatus for forming hollow articles of sheet material comprising a mandrel, means for rotating the mandrel to wind sheet material thereon, a pivoted arm, a presser roller carried by said arm adapted to ride on top of the mandrel for pressing the sheet material on to the material during the winding operation, an adjustable weight carried on said arm, and a spring attached to the end of the pivoted arm opposite the roller carrying end for causing the roller to press against the mandrel.

19. An apparatus for forming hollow articles of sheet material comprising a mandrel, means for rotating the mandrel to wind sheet material thereon, means for applying adhesive to one side of the sheet material, a substantially horizontal arm, pivoted on a pivot so located that points on the upper part of the mandrel, as it is rotated, travel away from said pivot, and a gravity actuated presser roller carried by said arm adapted to ride on top of the mandrel for pressing the sheet material onto the mandrel.

In testimony whereof I affix my signature.

GEORGE C. SNYDER.